(12) United States Patent
Muth et al.

(10) Patent No.: US 6,691,056 B2
(45) Date of Patent: Feb. 10, 2004

(54) CIRCUIT ARRANGEMENT FOR ERROR RECOGNITION OF A TWO-WIRE DATA BUS

(75) Inventors: Matthias Muth, Stelle (DE); Thomas Suermann, Hamburg (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 57 days.

(21) Appl. No.: 09/998,052

(22) Filed: Nov. 29, 2001

(65) Prior Publication Data

US 2002/0087937 A1 Jul. 4, 2002

(30) Foreign Application Priority Data

Nov. 30, 2000 (DE) .......................... 100 59 769

(51) Int. Cl.$^7$ .............................................. G06F 11/26
(52) U.S. Cl. ............................................ 702/122; 714/25
(58) Field of Search .......................... 702/122, 33, 34, 702/35, 36, 57, 58, 59, 60, 84, 121, 182, 183, 184, 185; 370/242, 216, 469, 395.5; 714/2, 25, 47, 746

(56) References Cited

U.S. PATENT DOCUMENTS

| | | | | |
|---|---|---|---|---|
| 5,483,639 A | * | 1/1996 | Haeussler et al. ............ 714/43 |
| 5,488,306 A | | 1/1996 | Bonaccio ..................... 324/539 |
| 5,687,391 A | * | 11/1997 | Judd et al. ..................... 710/15 |
| 5,838,950 A | * | 11/1998 | Young et al. .................. 703/21 |
| 5,903,565 A | * | 5/1999 | Neuhaus et al. ............. 370/402 |
| 6,111,888 A | * | 8/2000 | Green et al. ................. 370/461 |
| 6,115,831 A | * | 9/2000 | Hanf et al. ..................... 714/43 |
| 6,338,150 B1 | * | 1/2002 | Johnson et al. ............... 714/39 |
| 6,405,330 B1 | * | 6/2002 | Hanf et al. ................. 714/712 |
| 6,438,462 B1 | * | 8/2002 | Hanf et al. ................. 700/297 |
| 6,467,039 B1 | * | 10/2002 | Fredriksson ................. 713/151 |

* cited by examiner

Primary Examiner—Marc S. Hoff
Assistant Examiner—Edward Raymond
(74) Attorney, Agent, or Firm—Aaron Waxler

(57) ABSTRACT

In a circuit arrangement for error recognition of a two-wire data bus through which transmitted, dominant bits are differentially transmitted on the two bus lines, it is proposed that the arrangement comprises means (4) for measuring the differential current, by means of which the difference of the drive currents with which the two bus lines are driven is measured in a transmitter when transmitting dominant bits on the data bus, and in that evaluation means (5) are provided which supply an error signal when the difference between the drive currents exceeds a predetermined limit value.

11 Claims, 3 Drawing Sheets

CIRCUIT ARRANGEMENT FOR ERROR RECOGNITION OF A TWO-WIRE DATA BUS

Figure 1:
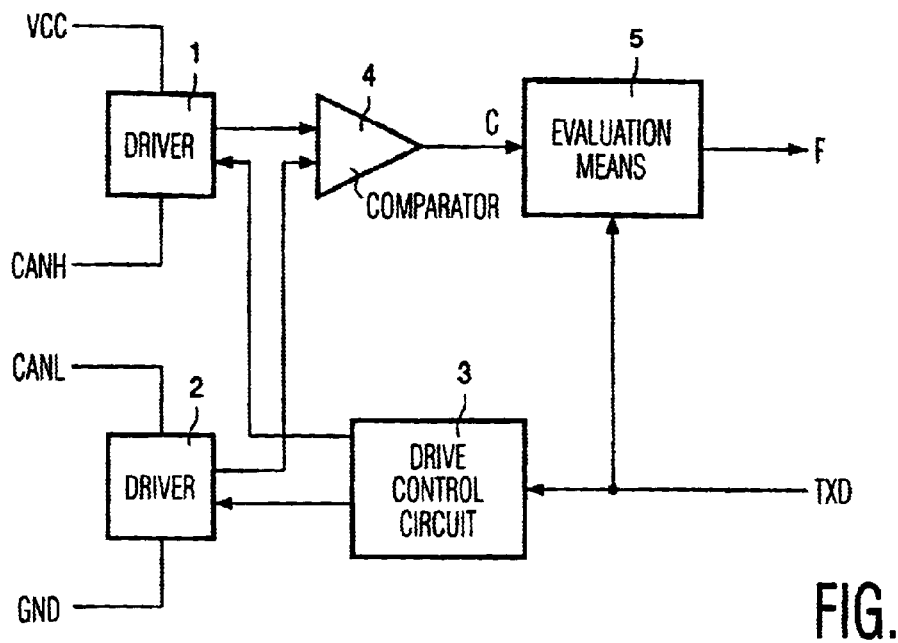

The invention relates to a circuit arrangement for error recognition of a two-wire data bus through which transmitted, dominant bits are differentially transmitted on the two bus lines.

In such data buses such as, for example, the CAN bus, whose properties have been laid down in ISO 11898, separate data bits are differentially transmitted on the two lines of the bus. In the rest state, both lines of the bus have approximately the same potential because both lines are coupled together via a terminating resistor. A dominant bit is actively transmitted from a transmitter to the bus by switching on a drive current. This transmission is performed differentially, i.e. the potential of one line of the bus is raised and the potential of the other line of the bus is lowered. A recessive bit is transmitted by a transmitter by switching off the drive current. Consequently, the two bus lines again approximately assume the same potential.

Errors of a different nature may occur in data buses of this type. Short-circuits of the individual lines may occur with respect to a reference potential but also with respect to each other.

Known circuit arrangements therefore evaluate the potentials of the lines and attempt to take such short-circuits into account. In a circuit arrangement which is known from U.S. Pat. No. 5,488,306, the difference between the potentials of the two bus lines is also evaluated. All of these known arrangements have the essential drawback that they react to mass offsets of the two bus lines. Such mass offsets, in which the potential of the two lines is shifted, may particularly occur in applications in the field of automobiles. In the known error recognition circuits, these mass offsets easily lead to false error messages, i.e. error messages which only refer to the mass offsets, which actually do not represent errors, and do not refer to actual short-circuits of the lines.

It is an object of the invention to provide a circuit arrangement of the type described in the opening paragraph, which allows a secure error recognition without reacting to mass offsets of the bus lines.

According to the invention, this object is solved in that the arrangement comprises means for measuring the differential current, by means of which the difference of the drive currents with which the two bus lines are driven is measured in a transmitter when transmitting dominant bits on the data bus, and in that evaluation means are provided which supply an error signal when the difference between the drive currents exceeds a predetermined limit value.

The fundamental idea of the invention is that there is no potential measurement but a current measurement. The difference between the two drive currents for driving a dominant bit on the data bus is measured. Transmitters transmitting data bits on the data bus generally have two drivers each driving a data bus line. Since the bits are differentially transmitted on the data bus, the drive currents have opposite signs. The difference between these drive currents is determined. If one of the two drive currents increased significantly, the difference would also increase significantly on the basis of the opposite polarity of the two drive currents. A predetermined limit value is provided which, in normal operation, is not exceeded by the difference between the drive currents. In one of the short-circuits described above, the differential current is, however, raised significantly and the predetermined limit value is exceeded. The circuit arrangement then supplies an error message.

Since both drive currents are measured and evaluated, potential shifts on the two lines of the two-wire bus do not lead to error messages because these potential shifts do not essentially influence the drive currents, because the terminating resistor of the two lines is arranged between them without potential.

Moreover, the circuit arrangement according to the invention has the general advantage of being tolerant to external EMV influences on the bus lines.

In accordance with an embodiment of the invention as defined in claim 2, the circuit arrangement is suitable for the CAN bus in accordance with ISO 11898, because this bus is used in vehicles in which mass offsets or EMV influences often occur in practice. Also under these conditions, the circuit arrangement according to the invention supplies an error signal only when there is actually a mutual short-circuit of the lines or when a short-circuit has occurred at a different potential.

In a further embodiment of the invention as defined in claim 3, the drive currents initially rise steeply when a transmitter transmits a dominant bit, because the lines of the bus represent a capacitive load. It is therefore advantageous not to measure and/or evaluate the difference between the drive currents at the start of a dominant bit but in the second half of the period of this bit because the transient phenomena due to the capacitive/inductive load represented by the two lines will then have declined.

In accordance with a further embodiment of the invention as defined in claim 5, the TXD signal provided in the CAN bus protocol may be advantageously evaluated for this purpose. The TXD signal indicates the period of a dominant bit. Advantageously, an orientation may be performed on the trailing edge of the TXD signal for each individual bit, because the transient phenomena on the bus lines have taken place at this instant and the drive currents are no longer influenced by the transient phenomena at this instant.

A further embodiment of the invention as defined in claim 4 ensures a very secure recognition of a short-circuit of the two lines of the data bus. To this end, the two drive currents are individually compared with a reference current, and an error message is supplied only when the two drive currents individually exceed the reference current. This results in an additional security for error recognition.

Since it is advantageous, as elucidated above, to evaluate the drive currents by the end of a bit phase of a dominant bit on the data bus, a further embodiment of the invention as defined in claim 6 is characterized in that the measurement and/or evaluation of the drive currents or the difference between the drive currents is triggered by means of a timer so that the measurement and/or evaluation is performed at a predetermined interval after the start of transmitting a dominant bit. This provides a further advantageous possibility in which the measurement of the difference between the drive currents is performed without influencing the transient phenomena on the bus lines.

The CAN protocol provides a simultaneous transmission by a plurality of CAN transceivers of dominant bits on the bus during a so-called arbitration phase as well as during transmission of the acknowledge bit and the error flex. During this phase, the current difference measurement may yield values which lead to an unwanted error indication. In a further embodiment of the invention as defined in claim 7, it is therefore advantageous to measure and/or evaluate the drive currents or their differences only during a transmit interrupt service routine in the CAN bus protocol, because in this phase only one participant may actively transmit bits on the bus. During this phase, a secure evaluation of the drive currents without interfering influences is thus possible.

To ensure that an error signal supplied by the circuit arrangement according to the invention is available for a sufficiently long time and is not destroyed by the arbitration phase of the next telegram, a further embodiment of the invention as defined in claim 8 is characterized in that the arrangement comprises shift registers by means of which the result of the evaluation is buffered so that an error signal may be supplied in a delayed manner. The length of this shift register determines the time available for a transmit interrupt service routine to evaluate an error indication.

To prevent differential currents occurring already during transmission of an individual bit from triggering an error indication, a further embodiment of the invention as defined in claim 9 is characterized in that the arrangement comprises a majority circuit. Such a majority circuit only triggers an error signal when the outcome of the majority of a plurality of measurements has shown that the limit value has been exceeded. This majority circuit can be advantageously connected to a shift register, because the shift register simultaneously supplies evaluation results for a plurality of dominant bits.

In a further embodiment of the invention as defined in claim 10, such a majority evaluation may be advantageously performed in that an error message is preferably suppressed only when the differential current has exceeded the predetermined limit value during transmission of a single bit, but not during transmission of the bits adjacent to this bit, i.e. the previous and the subsequent bit. In this case, it can be concluded that a faulty error evaluation may have taken place for the single bit. An error message is then suppressed.

A further embodiment of the invention as defined in claim 11 has for its object to exclude arbitration phases and acknowledge bits from the error evaluation by means of summation of the drive currents and thus to prevent a correctly evaluated error signal from being inadvertently overwritten prematurely during such a phase. Arbitration phases and acknowledge bits are characterized in that a plurality of transceivers can simultaneously transmit a dominant bit on the bus. Consequently, the sum of the two drive currents falls below a limit value and the current difference signal is not evaluated.

These and other aspects of the invention are apparent from and will be elucidated with reference to the embodiments described hereinafter.

Figure 2:
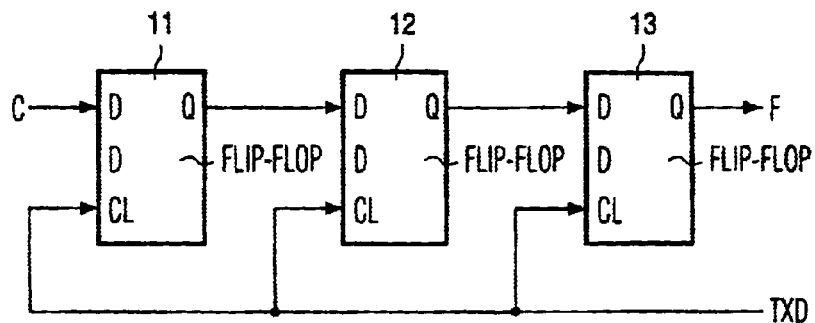
Figure 3:
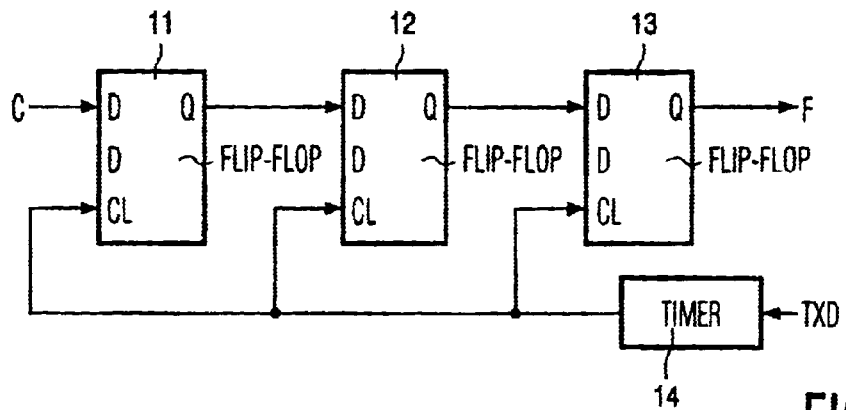
Figure 4:
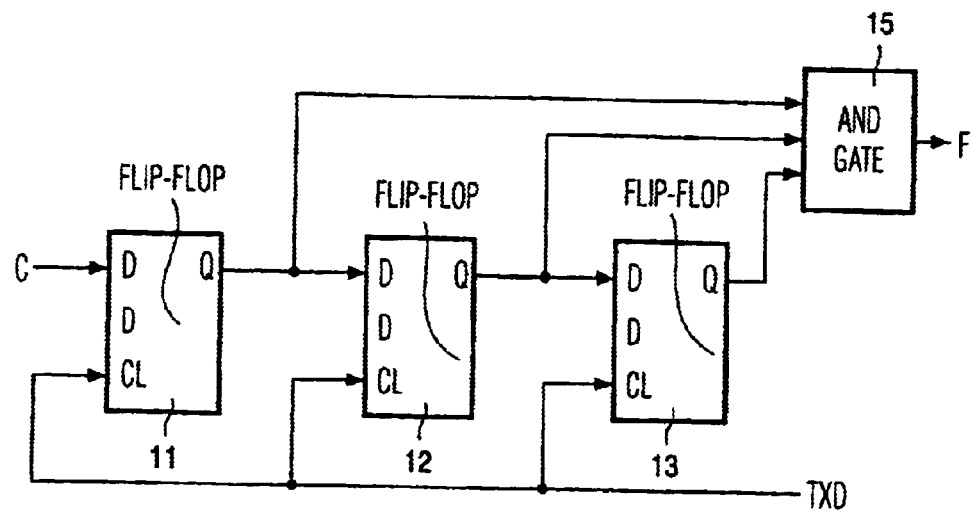
Figure 5:
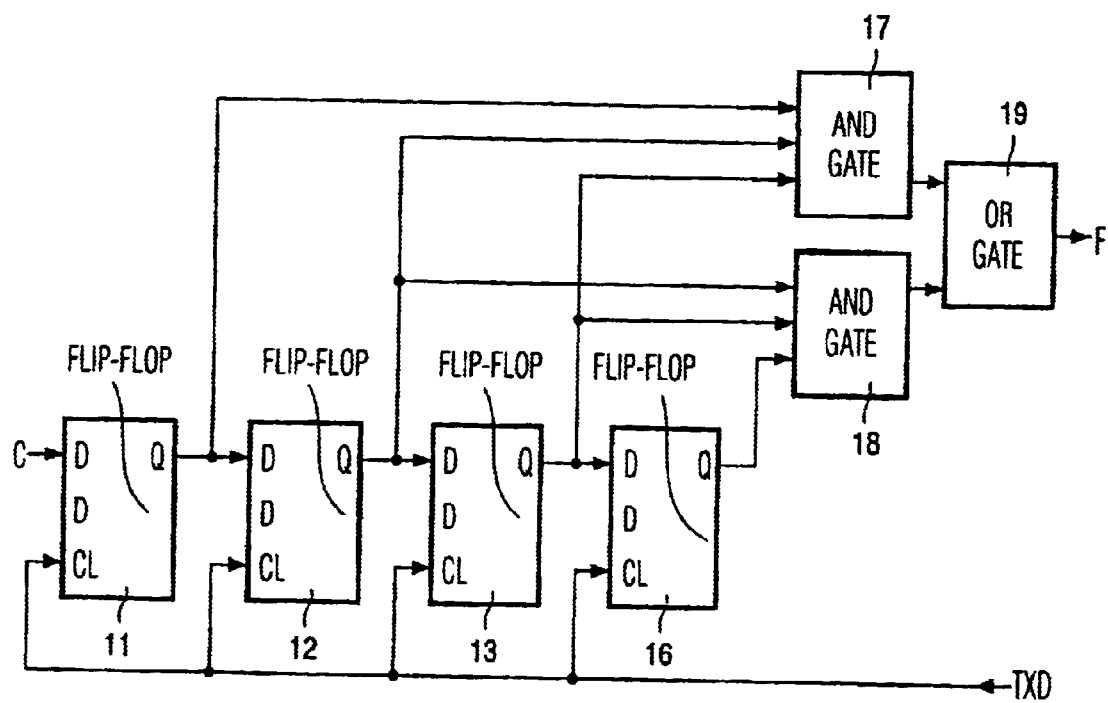
Figure 6:
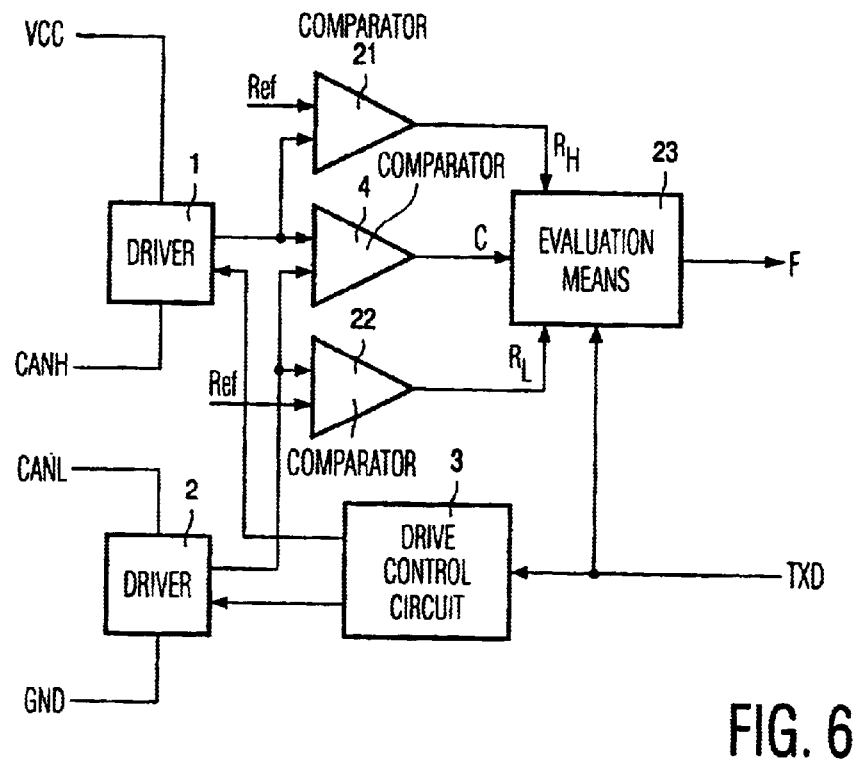
Figure 7:
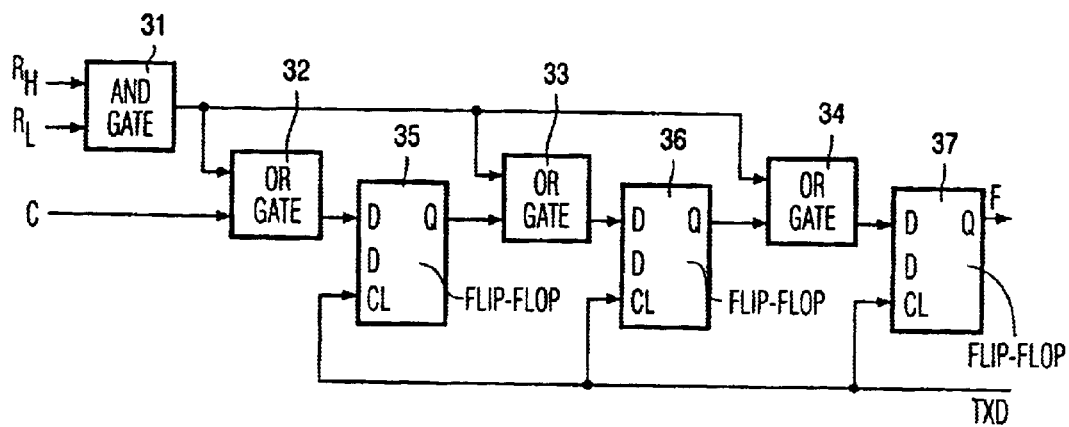

In the drawings:

FIG. 1 shows a first embodiment of the circuit arrangement according to the invention, in the form of a block diagram, FIG. 2 is a block diagram of a shift register as may be used, for example, in the evaluation means 5 of the circuit arrangement of FIG. 1, FIG. 3 shows a shift register in accordance with FIG. 2, with an additional timer, FIG. 4 shows a shift register in accordance with FIG. 2, with a majority evaluation, FIG. 5 shows a shift register with a majority evaluation in accordance with FIG. 4, but with an extended shift register so that an evaluation with time delay is possible, FIG. 6 shows a second embodiment of the circuit arrangement according to the invention in accordance with the first embodiment of FIG. 1 but with an additional single evaluation of the drive currents, and FIG. 7 is a possible detailed form of the evaluation means of the circuit in accordance with the second embodiment of FIG. 6.

FIG. 1 is a block diagram of a so-called transceiver, i.e. an apparatus which is connected to a data bus and by means of which data bits can be transmitted on the data bus. The block diagram of FIG. 1 further shows an implemented circuit arrangement for bus error recognition according to the invention.

In the embodiment of FIG. 1, the data bus is a CAN bus whose structure and protocol are laid down in accordance with ISO 11898. The data bus has two data bus lines CAN H and CAN L through which the bits are transmitted, for example, differentially.

In the rest state of the CAN bus, both data bus lines CAN H and CAN L have approximately the same potential, because the two lines are coupled together via a terminating resistor in a manner not shown in the Figure. When single bits are transmitted by a transmitter, the potential of the data bus line CAN H is raised and the potential of the data bus line CAN L is lowered.

In the circuit arrangement of FIG. 1, this is effected by means of a driver 1 for the data bus line CAN H and by means of a driver 2 for the data bus line CAN L. Both drivers 1 and 2 are controlled by means of a drive control circuit 3. The drive control circuit 3 controls the two drivers 1 and 2 synchronously in such a way that single bits are differentially transmitted through the two data bus lines CAN H and CAN L, respectively. To this end, the drive control circuit 3 is controlled by means of a signal TXD. In the rest state, the signal TXD has a high potential. A single active, dominant bit transmitted on the data bus is characterized in the signal TXD by low levels. As long as the signal TXD has a low level, a corresponding control of the drivers 1 and 2 by means of the drive control circuit 3 is performed so that the bit is differentially transmitted through the two data bus lines CAN H and CAN L in the manner described above. For the purpose of current supply, the driver 1 is connected to a power supply potential VCC and the driver 2 is connected to a reference potential GND.

In such a transmission of dominant bits on the data bus, interferences may occur. Particularly, the data bus lines CAN H and CAN L may have a short-circuit with respect to another potential, or a mutual short-circuit. It is therefore desirable to determine at any time whether there is such an error condition. However, when determining such error conditions it is an extra difficulty that a mass offset may take place on the data bus lines CAN H and CAN L, which may particularly occur in the field of motor vehicles. Therefore, a circuit arrangement for error recognition according to the invention is provided which reacts to short-circuits of the two-wire data bus but is insensitive to potential shifts of the two bus lines.

The fundamental idea of the circuit arrangement for error recognition according to the invention is that the difference between the two drive currents supplied by the drivers 1 and 2 on the data bus is measured. In contrast to the prior-art arrangements, in which voltages are evaluated, a current evaluation is performed in this case which is clearly more insensitive to potential shifts or external EMV influences.

The circuit arrangement according to the invention therefore comprises means 4 for differential current measurement. The means 4 are formed as comparators in the embodiment of FIG. 1, receiving a signal from the driver 1 and the driver 2, which signal is proportional to the drive current sent by the drivers 1 and 2 to the data bus lines CAN H and CAN L, respectively. By means of the comparator 4, these drive currents are subtracted and compared with a predetermined limit value. This comparison result is applied as signal C to evaluation means 5. The means 5 further evaluate the signal C and supply a corresponding error signal F. Since the evaluation of the difference between the drive currents should only take place during transmission of dominant bits by means of the transceiver shown in FIG. 1, the signal TXD is applied to the evaluation means 5 so that the means 5 evaluate the signal C only during those periods in which the signal TXD has a low level in which the transceiver thus transmits a dominant bit on the data bus. Moreover, the means 5 may be implemented in such a way that they perform a time delay of the signal F and/or evaluate the signal C through a plurality of values.

Moreover, a summation of the drive currents may be performed, in a manner not shown, by means of a summing device and evaluated by means of a further comparator in which a comparison with a second predetermined limit value is performed. The comparison signal may be used for supplying the signal TXD to the means 5 only during those periods in which the sum signal falls below the limit value. Arbitration phases and acknowledge bits may thereby be excluded from the error evaluation. It is thereby prevented that a correctly evaluated error signal is inadvertently overwritten prematurely during such a phase. Arbitration phases and acknowledge bits are characterized in that a plurality of transceivers can simultaneously transmit a dominant bit on the bus. Consequently, the sum of the two drive currents falls below a limit value and the current-difference signal is not evaluated.

The means 5 may be formed as a counter with a count n which counts up at a positive signal C and counts down at a negative signal C. The counting results may be triggered at the end of the dominant bit phase. When the counter exceeds a predetermined value, the error signal F is set. Simultaneously, a majority evaluation is achieved because an error signal is not supplied until after n times more frequently a current-difference error has been determined as being not such an error.

FIG. 2 shows a possible implementation of the evaluation means 5 of FIG. 1. FIG. 2 shows a shift register chain of 3 D flip-flops 11, 12 and 13 arranged one after the other. The signal TXD is applied to the clock inputs of the D flip-flops 11, 12 and 13. The signal C is applied to the input of the first shift register 11. The error signal F is supplied from the output of the last D flip-flop 13 of the shift register chain.

A delay of the error indication may be achieved by means of such a shift register within the evaluation means 5, with the duration of the delay being dependent on the length of the shift register. Every new value C is taken over in the subsequent shift register with a new pulse of the signal TXD. In the embodiment shown in FIG. 3, the delay of the error signal F covering a period of three transmitted dominant bits is achieved in this way.

The D flip-flops 11, 12 and 13 are advantageously clocked by the positive edge of the signal TXD. This trailing edge of the signal TXD appears at the end of each dominant bit. At this instant, the drivers 1 and 2 of the arrangement of FIG. 1 are still fully active so that the drive currents can be evaluated. The evaluation at this instant also ensures that transient phenomena which may occur upon switching of a dominant bit on the data bus lines CAN H and CAN L, are no longer active.

Another possibility of evaluating the drive currents only by the end of the bit phase of each transmitted dominant bit is shown in FIG. 3. FIG. 3 shows a shift register with D flip-flops 11, 12 and 13 in accordance with the circuit of FIG. 2. In the variant of FIG. 3, however, the signal TXD is delayed by means of a timer 14. Here, the D flip-flops are formed in such a way that they react to the leading edge of the TXD signal, i.e. to its negative edge. The timer 14 sets such a delay that the D flip-flops 11, 12 and 13 take over data at their data inputs D only during the second half of the period of a dominant bit. It can also be ensured in this way that the differential currents are evaluated only in the second half of a transmitted dominant bit.

FIG. 4 shows a further variant of the means 5 of the circuit arrangement of FIG. 1. This variant also comprises 3 D flip-flops 11, 12 and 13 which are arranged one after the other and are clocked by means of the signal TXD. However, in this variant, a delay in the supply of the error signal F is not achieved. The object rather is to achieve a majority evaluation of three consecutive error signals stored in the D flip-flops 11, 12 and 13. To this end, all of the three data outputs Q of the D flip-flops 11, 12 and 13 are connected to three inputs of an AND gate 15. The AND gate 15 supplies the error signal F from the output. It is thereby achieved that an error signal F is supplied only when the signal C has signalized during three consecutive dominant bits that the differential current of the two drivers has exceeded the predetermined limit value.

Other variants of the majority evaluation are of course also possible. In any case, a majority evaluation should ensure that an error signal is not already supplied when the error condition is fulfilled during transmission of a single dominant bit, because this condition might have been the case on possible grounds of interferences.

The variant shown in FIG. 4 of the means 5 for evaluating the difference signal no longer provide the possibility of performing a time-delayed evaluation. However, this is possible in accordance with FIG. 5. FIG. 5 shows a shift register with D flip-flops 11, 12 and 13 which are connected in accordance with the variant of FIG. 4. However, the shift register is extended by one further D flip-flop 16 arranged after the D flip-flop 13.

A first AND gate 17 is provided which evaluates the data outputs of the D flip-flops 11, 12 and 13, and a second AND gate 18 which evaluates the data outputs of the D flip-flops 12, 13 and 16. The output signals of the two AND gates 17 and 18 are applied to an OR gate 19 which supplies the error signal F from the output.

By means of the extended shift register and the modified majority evaluation in the circuit arrangement of FIG. 5 it is achieved that not only the majority evaluation but also a time delay is achieved as is provided for the variants of FIGS. 2 and 3 without majority evaluation.

The variant of the evaluation means 5 shown in FIG. 5 thus combines a time delay of the supply of the error signal F of the variants shown in FIGS. 2 and 3 with a majority evaluation of the variant of the evaluation means 5 shown in FIG. 4.

FIG. 6 is a block diagram of a second embodiment of the circuit arrangement according to the invention, in a transceiver.

The transceiver of the second embodiment shown in FIG. 6 comprises a first driver 1, a second driver 2 and a drive control circuit 3, similarly as the transceiver of the first embodiment shown in FIG. 1. The operation of the transceiver is in so far identical with that of the first embodiment shown in FIG. 1.

In conformity with the first embodiment, the circuit arrangement for error recognition according to the invention also comprises a comparator 4 which receives the drive currents from the two drivers 1 and 2 and supplies a signal C from the output which signalizes the value of the difference between the two drive currents. This signal is evaluated by evaluation means 23 which supply the error signal from the output. The operation of the circuit arrangement according to the invention, shown in the second embodiment, is in so far also identical to that shown in the first embodiment of FIG. 1.

The second embodiment of the circuit arrangement according to the invention, shown in FIG. 6, comprises, however, additional means 21, 22 and 23 which directly compare the currents of the drivers 1 and 2 with a reference signal REF and supply also an error signal when the drive currents individually exceed this reference signal REF.

To this end, a comparator 21 is provided which compares the drive current of the driver 1 with the reference signal REF and supplies a corresponding output signal to the evaluation means 23.

In a corresponding manner, a comparator 22 is provided which compares the drive current of the driver 2 with the reference signal REF and also supplies the comparison result to the evaluation means 23.

The evaluation means 23 supply an error signal when either the difference between the drive currents exceeds the predetermined limit value, or when the drive current of the driver 1 exceeds the reference signal REF, or when the drive current of the driver 2 exceeds the reference signal REF.

Due to this additional evaluation of the individual drive currents, an additional recognition security is achieved. Particularly, a short-circuit between the lines can be recognized with greater certainty by virtue of the extension of the circuit arrangement.

FIG. 7 shows a possible implementation of the evaluation means 23 of the circuit arrangement shown in FIG. 6.

The two signals R Index and H and R Index L supplied by the comparators 21 and 22 are applied in the circuit arrangement of FIG. 7 to an AND gate 31 whose output signal is applied to first inputs of OR gates 32, 33 and 34.

The signal C of the comparator 4 of the circuit arrangement shown in FIG. 6 is applied to the second input of the OR gate 32.

The circuit arrangement shown in FIG. 7 comprises three D flip-flops 35, 36 and 37 which are clocked by means of the signal TXD.

The output signal of the OR gate 32 is applied to the data input D of the flip-flop 35 whose output signal is applied to the second input of the OR gate 33. Its output signal is in turn applied to the second D flip-flop 36 whose output signal is coupled to the second input of the OR gate 34. The output signal of the OR gate 34 is coupled to the data input of the D flip-flop 37, whose data output Q supplies the error signal F.

It is achieved by the variants of the shift register in the circuit arrangement of FIG. 7 that it is additionally checked for every individual buffered error condition whether one of the signals R Index H or R Index L has been responsive for the relevant dominant bit. The D flip-flops 35, 36 and 37 thus store an error signal for every individual dominant bit when one of the three error conditions has been fulfilled, i.e. when one of the signals R Index H, R Index L or C was active during transmission of the assigned dominant bit.

The error signal F may be additionally filtered in the second embodiment shown in FIGS. 6 and 7. However, it should be noted that a recognition of the short-circuit between the two CAN bus lines CAN H and CAN L must be directly evaluated because such a short-circuit prevents the possibility of data transmission through the bus and deactivates the data transmission immediately.

What is claimed is:

1. A circuit arrangement for error recognition of a two-wire data bus through which transmitted, dominant bits are differentially transmitted on the two bus lines, characterized in that the arrangement comprises means (4) for measuring the differential current, by means of which the difference of the drive currents with which the two bus lines are driven is measured in a transmitter when transmitting dominant bits on the data bus, and in that evaluation means (5) are provided which supply an error signal when the difference between the drive currents exceeds a predetermined limit value.

2. An arrangement as claimed in claim 1, characterized in that the two-wire bus is a CAN bus in accordance with ISO 11898.

3. An arrangement as claimed in claim 1, characterized in that the arrangement measures and/or evaluates the difference between the drive currents in the second half of the period of a transmitted bit.

4. An arrangement as claimed in claim 1, characterized in that the arrangement additionally comprises means (21, 22, 23) which compare both drive currents individually with a reference current and supply an error message when both drive currents individually exceed the reference current.

5. An arrangement as claimed in claim 2, characterized in that the TXD input signal of a CAN bus transmitter is used for determining the instant of measuring and/or evaluating the drive currents, particularly in that the trailing edges of the TXD signal determine the measuring instants.

6. An arrangement as claimed in claim 3, characterized in that the arrangement comprises a timer (14) which triggers the measurement and/or evaluation of the drive currents by a predetermined interval after the start of transmitting a dominant bit.

7. An arrangement as claimed in claim 2, characterized in that the arrangement measures and/or evaluates the drive currents only during a transmit interrupt service routine of the CAN bus.

8. An arrangement as claimed in claim 2, characterized in that the arrangement comprises a shift register (11, 12, 13; 16; 35, 36, 37) by means of which the error signal is supplied in a delayed manner.

9. An arrangement as claimed in claim 8, characterized in that the arrangement comprises a majority circuit (15; 17, 18, 19) which configures the evaluation of the measurements in such a way that an error message is supplied only when the outcome of the majority of a plurality of measurements has shown that the limit value has been exceeded.

10. An arrangement as claimed in claim 1, characterized in that, in the majority evaluation, the arrangement also takes those bit positions into account and preferably suppresses an error message only when the limit was exceeded during transmission of a bit, but not when the two bits adjacent to this bit were transmitted.

11. An arrangement as claimed in claim 1, characterized in that the arrangement not only evaluates the difference between the drive currents but also evaluates their sum, and evaluates the difference between the drive currents only when the sum of the drive currents exceeds a predetermined limit value.

* * * * *